US012809039B2

(12) United States Patent
Alizadeh et al.

(10) Patent No.: US 12,809,039 B2
(45) Date of Patent: Nov. 24, 2026

(54) GNSS DRIVEN DYNAMIC PARTITIONING OF APs

(71) Applicant: Cisco Technology, Inc., San Jose, CA (US)

(72) Inventors: Ardalan Alizadeh, Campbell, CA (US); Navid Reyhanian, Fremont, CA (US); Audrey Yazdanparast, Akron, OH (US); Peiman Amini, Fremont, CA (US); Jerome Henry, Pittsboro, NC (US)

(73) Assignee: Cisco Technology, Inc., San Jose, CA (US)

( * ) Notice: Subject to any disclaimer, the term of this patent is extended or adjusted under 35 U.S.C. 154(b) by 403 days.

(21) Appl. No.: 18/467,040

(22) Filed: Sep. 14, 2023

(65) Prior Publication Data

US 2025/0093530 A1 Mar. 20, 2025

(51) Int. Cl.
*G01S 19/48* (2010.01)

(52) U.S. Cl.
CPC .................................... *G01S 19/48* (2013.01)

(58) Field of Classification Search
CPC ............................... G01S 19/48; G01S 5/0018
See application file for complete search history.

(56) References Cited

U.S. PATENT DOCUMENTS 8,983,764 B2 * 3/2015 Jacobs ................ H04W 64/006
701/300
2014/0235266 A1 8/2014 Edge et al.
2016/0282475 A1 9/2016 Harper et al.
(Continued)

FOREIGN PATENT DOCUMENTS

CN 105074494 A * 11/2015 ........... G01S 5/0295
WO 2023019613 A1 2/2023
WO WO-2023154650 A1 * 8/2023 ........... H04L 5/0051

OTHER PUBLICATIONS

International Search Report and Written Opinion for International Application No. PCT/US2024/046674, mailed Mar. 25, 2025, 19 Pages.

*Primary Examiner* — Jack W Keith
*Assistant Examiner* — Clayton Paul Ridder
(74) *Attorney, Agent, or Firm* — Rutan & Tucker, LLP; Ravi Mohan; Marc McClain

(57) ABSTRACT

Described herein are devices, systems, methods, and processes for managing the computational complexity in geolocating a large number of network devices (e.g., access points (APs)) in indoor environments. A number of network devices may be partitioned into smaller groups or batches based on neighbor knowledge about the network devices. Each batch of network devices can include just devices located on a same floor, or may include devices located across different floors. Every batch may include at least one anchor network device. The geolocation of the network devices can be determined, batch-by-batch, based on fusing global navigation satellite system (GNSS) pseudorange measurements and inter-network device ranging measurements. The geolocation accuracy for each partition can be evaluated utilizing such metrics as the average residual error. If the error for a batch is greater than a threshold, remedial measures may be taken to reduce the error and improve the geolocation accuracy.

18 Claims, 8 Drawing Sheets

(56) References Cited

U.S. PATENT DOCUMENTS

| | | | | |
|---|---|---|---|---|
| 2017/0280288 | A1 | 9/2017 | Do et al. | |
| 2020/0137661 | A1 | 4/2020 | Rahman et al. | |
| 2020/0323035 | A1 | 10/2020 | Edge et al. | |
| 2021/0132180 | A1 | 5/2021 | Yang et al. | |
| 2023/0065533 | A1* | 3/2023 | Cui | H04B 7/18508 |
| 2023/0179950 | A1 | 6/2023 | Ganu et al. | |
| 2023/0258815 | A1 | 8/2023 | Ghimire et al. | |
| 2024/0323892 | A1* | 9/2024 | Wu | G01S 1/042 |
| 2024/0414682 | A1* | 12/2024 | Kumar | H04L 5/0051 |

* cited by examiner

GNSS DRIVEN DYNAMIC PARTITIONING OF APs

The present disclosure relates to geolocation technologies. More particularly, the present disclosure relates to managing the computational complexity of the optimization problem in geolocating a large number of network devices in indoor environments.

BACKGROUND

In the field of geolocation technologies, accurately determining the location of a large number of network devices (e.g., access points (APs)) in indoor environments may be a complex task. The complexity can arise from the need to solve an optimization problem that grows exponentially more complex as the number of network devices increases. The challenge may be particularly pronounced in large indoor environments, where the sheer number of network devices can lead to a significant increase in computational complexity.

Existing solutions for centralized, or cooperative, localization may often be formulated as optimization problems with constraints. The solutions can be applied in either two-dimensional (2D) or three-dimensional (3D) scenarios, depending on the availability of inter-floor ranging. However, the optimization problems are typically non-convex, necessitating conversion to a convex form through some form of relaxation, often semidefinite relaxation. Once converted to known forms of convex optimizations such as, but not limited to, semidefinite programming (SDP) or second order cone programming (SOCP), the optimization problems can be solved using such numerical solvers as interior point methods.

However, the numerical solvers can require significant processing power. The complexity of the solvers tends to grow exponentially with respect to the number of network devices. By way of a non-limiting example, depending on the type of optimization problem the solver utilized, the processing time can range from a few seconds for 50 network devices to hours for 1000 network devices. The exponential increase in complexity and processing time as the number of network devices increases can present a significant challenge in the field of indoor geolocation.

SUMMARY OF THE DISCLOSURE

Systems and methods for managing the computational complexity of the optimization problem in geolocating a large number of network devices in indoor environments in a communication network in accordance with embodiments of the disclosure are described herein. In some embodiments, a network node includes a processor, at least one network interface controller configured to provide access to a network, and a memory communicatively coupled to the processor, wherein the memory includes a localization logic. The logic is configured to receive a plurality of global navigation satellite system (GNSS) pseudorange measurements associated with a first subset of network devices in a plurality of network devices and one or more inter-network device ranging measurements associated with a second subset of network devices in the plurality of network devices, identify, in the plurality of network devices, a plurality of batches of network devices, the plurality of batches of network devices including all network devices in the plurality of network devices, and determine, batch-by-batch, for each batch of network devices, a geo-position of each network device in the batch of network devices based on a subset of the plurality of GNSS pseudorange measurements associated with the batch of network devices or a subset of the one or more inter-network device ranging measurements associated with the batch of network devices.

In some embodiments, each batch of network devices in the plurality of batches of network devices include at least one anchor network device.

In some embodiments, a number of GNSS pseudorange measurements associated with the at least one anchor network device is greater than a threshold.

In some embodiments, a number of inter-network device ranging measurements associated with the at least one anchor network device is greater than a threshold.

In some embodiments, each batch of network devices in the plurality of batches of network devices include at most a predetermined number of network devices.

In some embodiments, to identify the plurality of batches of network devices, the localization logic is further configured to maximize a number of network devices associated with at least one GNSS pseudorange measurement in each of one or more batches of network devices.

In some embodiments, wherein the identifying of the plurality of batches of network devices and the determining of the geo-position are performed independently of each other.

In some embodiments, the identifying of the plurality of batches of network devices and the determining of the geo-position are performed in a combined fashion.

In some embodiments, the localization logic is further configured to evaluate, for each batch of network devices, an accuracy of the determined geo-position of each network device in the batch of network devices.

In some embodiments, the localization logic is further configured to add an anchor network device to at least one batch of network devices in response to the accuracy of the determined geo-position associated with the at least one batch of network devices is less than a threshold, and re-determine, for the at least one batch of network devices, the geo-position of each network device in the at least one batch of network devices based at least in part on the added anchor network device.

In some embodiments, the plurality of batches of network devices is identified based on neighbor knowledge associated with the plurality of network devices.

In some embodiments, the localization logic is further configured to obtain the neighbor knowledge associated with the plurality of network devices based on one or more of a plurality of air pressure readings, a plurality of neighbor discovery protocol (NDP) packets, or a plurality of received signal strength indicator (RSSI) measurements.

In some embodiments, at least one batch of network devices in the plurality of batches of network devices are located on a same floor.

In some embodiments, at least one batch of network devices in the plurality of batches of network devices are located on one than one floors.

In some embodiments, the plurality of batches of network devices is identified based on at least some inter-network device ranging measurements in the one or more inter-network device ranging measurements.

In some embodiments, the localization logic is further configured to identify a first batch of network devices and a second batch of network devices in the plurality of batches of network devices, the first batch of network devices and the second batch of network devices having one or more common network devices, and evaluate, for the first batch of network devices or the second batch of network devices, an accuracy of the determined geo-position of each network device in the first batch of network devices or the second batch of network devices based on an exclusion of one or more common network devices.

In some embodiments, the localization logic is further configured to re-determine, iteratively between the first batch of network devices and the second batch of network devices until convergence, the geo-position of each network device in the first batch of network devices and the second batch of network devices based on utilizing the one or more common network devices as one or more anchor network devices in an iterative process in response to the accuracy of the determined geo-position being less than a threshold.

In some embodiments, one or more network devices in the plurality of network devices each correspond to an access point (AP).

In some embodiments, a network device includes a processor, at least one network interface controller configured to provide access to a network, and a memory communicatively coupled to the processor, wherein the memory includes a geolocation logic. The logic is configured to obtain one or more pseudorange measurements via a global navigation satellite system (GNSS) receiver, obtain one or more inter-network device ranging measurements to one or more other network devices, transmit an indication of the one or more pseudorange measurements and an indication of the one or more inter-network device ranging measurements to a network node, and receive an indication of a geo-position of the network device from the network node.

In some embodiments, a method for geolocating a plurality of network devices, includes receiving a plurality of global navigation satellite system (GNSS) pseudorange measurements associated with a first subset of network devices in the plurality of network devices and one or more inter-network device ranging measurements associated with a second subset of network devices in the plurality of network devices, identifying, in the plurality of network devices, a plurality of batches of network devices, the plurality of batches of network devices including all network devices in the plurality of network devices, and determining, batch-by-batch, for each batch of network devices, a geo-position of each network device in the batch of network devices based on a subset of the plurality of GNSS pseudorange measurements associated with the batch of network devices or a subset of the one or more inter-network device ranging measurements associated with the batch of network devices.

Other objects, advantages, novel features, and further scope of applicability of the present disclosure will be set forth in part in the detailed description to follow, and in part will become apparent to those skilled in the art upon examination of the following or may be learned by practice of the disclosure. Although the description above contains many specificities, these should not be construed as limiting the scope of the disclosure but as merely providing illustrations of some of the presently preferred embodiments of the disclosure. As such, various other embodiments are possible within its scope. Accordingly, the scope of the disclosure should be determined not by the embodiments illustrated, but by the appended claims and their equivalents.

BRIEF DESCRIPTION OF DRAWINGS

The above, and other, aspects, features, and advantages of several embodiments of the present disclosure will be more apparent from the following description as presented in conjunction with the following several figures of the drawings.

Figure 1:
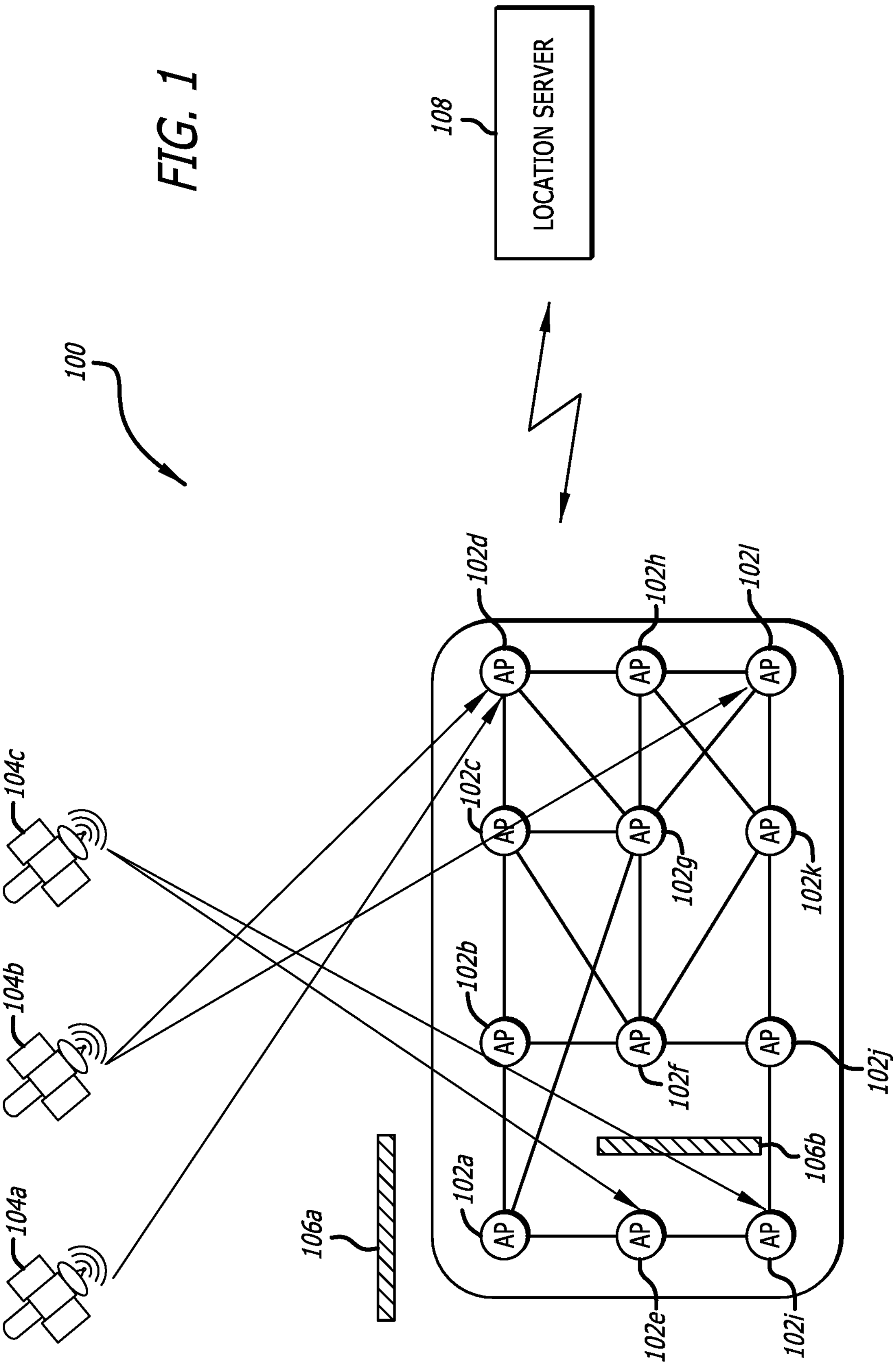
FIG. 1 is a diagram illustrating a system environment in accordance with various embodiments of the disclosure.

Corresponding reference characters indicate corresponding components throughout the several figures of the drawings. Elements in the several figures are illustrated for simplicity and clarity and have not necessarily been drawn to scale. For example, the dimensions of some of the elements in the figures might be emphasized relative to other elements for facilitating understanding of the various presently disclosed embodiments. In addition, common, but well-understood, elements that are useful or necessary in a commercially feasible embodiment are often not depicted in order to facilitate a less obstructed view of these various embodiments of the present disclosure.

DETAILED DESCRIPTION

In response to the issues described above, devices and methods are discussed herein that manage the computational complexity in geolocating a large number of network devices in indoor environments. This may be achieved by partitioning the network devices into smaller groups or batches, and determining their geolocation on a batch-by-batch basis. Hereinafter terms including geo-positioning, geolocalization, localization, geolocating, or geolocation may be used interchangeably. Any of the terms may refer to the process of determining or estimating the geographic position (also referred to as the geo-position or geolocation) (e.g., geographic coordinates including latitude, longitude, and/or altitude) of an object (e.g., a wireless network device such as an access point (AP)).

In many embodiments, at least some network devices may each be equipped with a global navigation satellite system (GNSS) receiver that collects pseudorange data from satellite links. By way of a non-limiting example, a GNSS receiver may make a pseudorange measurement to an observable satellite (e.g., per satellite per link). The network devices may report the pseudorange data to a location server. In a number of embodiments, the location server may be co-located or implemented at one of the network devices being geolocalized. In a variety of embodiments, the location server may be implemented at a remote device (e.g., a management device) that is not being geolocalized. In some embodiments, the network devices may also obtain and collect terrestrial-based inter-network device ranging measurements between each other. Herein ranging may refer to the process of determining the distance between two network devices, often by measuring the time it takes for a signal to travel from one network device to the other network device (one way or roundtrip). The ranging measurements can be made via Wi-Fi-based or non-Wi-Fi based techniques. A non-limiting example of a Wi-Fi-based approach may be fine time measurement (FTM). Further, non-limiting examples of non-Wi-Fi-based approaches can include ultra-wideband (UWB) or high-accuracy distance measurement (HADM).

In more embodiments, the geolocation of the network devices may be estimated (e.g., by a localization solver module at the location server) based on jointly utilizing pseudorange measurements from GNSS satellites and terrestrial-based ranging measurements between network devices. In additional embodiments, the network devices may be partitioned into multiple batches, such that each batch of network devices may include a manageable number of network devices for the centralized (cooperative) geolocation. Accordingly, in further embodiments, the partitioning of network devices into multiple batches can be performed independently of the localization solver (i.e., standalone partitioning). In still more embodiments, the partitioning can be based on the neighbor knowledge in relation to each network device (e.g., which other network devices are nearby). In still further embodiments, the neighbor knowledge may be obtained based on techniques such as, but not limited to, neighbor discovery protocol (NDP) or received signal strength indicator (RSSI) measurements. In still additional embodiments, a batch of network devices may include just network devices that are located on a same floor of the building (e.g., a 2D scenario). In some more embodiments, a batch of network devices may include network devices that are located across different floors of the building (e.g., a 3D scenario). In certain embodiments, the floor on which a network device is located may be determined based on one or more air pressure readings from an air pressure sensor implemented in the network device (e.g., the air pressure may be lower on higher floors).

In yet more embodiments, each batch of network devices may include at least one anchor network device. In general, an anchor network device may be one where a greater amount of data useful for the geolocation process can be collected. By way of non-limiting examples, in still yet more embodiments, an anchor network device may refer to a network device that can collect sufficient GNSS pseudorange measurements from its own GNSS receiver for determining the geolocation of the network device. In many further embodiments, an anchor network device may refer to a network device whose number of observable GNSS satellites is greater than a threshold (e.g., the threshold may be 1, 2, 3, . . . , etc.). In many additional embodiments, an anchor network device may refer to a network device whose number of inter-network device ranging measurement links to other network devices is greater than a threshold. In still yet further embodiments, the partitioning can be associated with and based on a maximum batch size (e.g., N network devices in each batch at a maximum). In still yet additional embodiments, a specific batch of network devices may be identified where the number of anchor network devices in the batch is maximized (e.g., within the limit of the maximum batch size). A person of ordinary skill in the art may recognize that identification of this batch may relate to a geometric Steiner tree problem. In several embodiments, further batches of network devices can be identified based on common (overlapped) network devices between one or more already-identified batches and the additional batch being identified. In several more embodiments, the partitioning may be based at least part on the inter-network device ranging data. Therefore, the connectivity of a would-be batch (e.g., to one or more other batches via ranging measurement links) can be utilized as a metric for the identification of the batch.

In numerous embodiments, the partitioning of network devices into multiple batches can be performed in combination with the localization solver (i.e., closed-loop partitioning). In numerous additional embodiments, the accuracy of the estimated geolocation for each batch of network devices may be evaluated based on metrics such as, but not limited, the average residual error of the inter-network device ranging measurements (e.g., the average difference between the inter-network device distance as determined based on the estimated geolocation and the inter-network device distance as determined based on the ranging measurement). In further additional embodiments, if the accuracy of the estimated geolocation for a batch of network devices is not acceptable (e.g., less than a threshold), the batch can be adjusted by adding one or more anchor network devices (e.g., the anchor network devices closest to the batch according to the neighbor knowledge) to the batch. Subsequent to the adjustment, the geolocation of the network devices in the batch may be re-determined (e.g., by the localization solver at the location server). The re-determination may take into account the additional data collected from the newly added anchor network devices. In many embodiments, the accuracy evaluation-batch adjustment-geolocation re-determination process may be repeated until the accuracy of the estimated geolocation for the batch becomes acceptable or satisfactory.

In a number of embodiments, common network devices can be utilized for sequential anchoring in the geolocation process. By way of a non-limiting example, a first batch and a second batch may have one or more common network devices. The geolocation of the common network devices may be estimated when the geolocation of network devices in the first batch is estimated. Thereafter, the estimated geolocation of the common network devices can be utilized in the estimation of the geolocation of network devices in the second batch. In a variety of embodiments, common network devices can be utilized for the evaluation of the accuracy of the geolocation estimation. By way of a non-limiting example, a first batch and a second batch may have one or more common network devices. The geolocation of the network devices may be estimated separately for the first batch and the second batch, where the geolocation estimation process for one batch may not refer to any result from the geolocation estimation process for the other batch. Thereafter, the estimated geolocation of the common network devices according to the geolocation estimation process for the first batch can be compared against the estimated geolocation of the same common network devices according to the geolocation estimation process for the second batch. A large difference (e.g., a difference greater than a threshold) may indicate the inaccuracy of the geolocation estimation for at least one of the two batches. By way of another non-limiting example, a first batch and a second batch may have one or more common network devices. The geolocation of the network devices may be estimated for the first batch. Accordingly, the geolocation of the common network devices may be estimated based on the geolocation estimation process for the first batch. Then, the geolocation of the network devices may be estimated for the second batch excluding the common network devices. The accuracy of the geolocation estimation for the first batch may be evaluated based on the average residual error of the inter-network device ranging measurements between the common network devices and network devices exclusively within the second batch (e.g., the average difference between the inter-network device distance as determined based on the estimated geolocation and the inter-network device distance as determined based on the ranging measurement). Of course, the accuracy of the geolocation estimation for the second batch may be similarly evaluated.

In some embodiments, if the average residual error is large (i.e., the geolocation estimation is insufficiently accurate) for two partitions that have common network devices and if the two partitions each have enough non-common anchor network devices, the accuracy of the geolocation estimation for the two partitions may be improved based on iterating between the geolocation estimation processes for the two partitions, where the uncertainty region (e.g., a degree of uncertainty) for just the common network devices may be considered during the iterative process. By way of a non-limiting example, a first batch and a second batch may have one or more common network devices. The geolocation of the network devices may be estimated for the first batch. Then, when the geolocation of network devices in the second batch is being estimated, the geolocation estimation for the common network devices that was obtained from the geolocation estimation process for the first batch can be utilized, and the uncertainty region for just the common network devices may be considered. Thereafter, the geolocation of network devices in the first batch can be estimated again, where the geolocation estimation for the common network devices that was obtained from the geolocation estimation process for the second batch can be utilized, and the uncertainty region for just the common network devices (which may be smaller uncertainty regions) may be considered. The process may be repeated until the geolocation estimations obtained from the geolocation estimation process for both batches converge (e.g., until the average residual error is less than a threshold).

In more embodiments, the network devices to be geolocalized may be divided into multiple non-overlapping batches. In other words, none of the batches may include a common network device with another batch. The batches that include one or more anchor network devices that have sufficient GNSS signal reception (e.g., reception from at least a threshold number of GNSS satellites, where the threshold may be 1, 2, 3, . . . , etc.) may be referred to as GNSS-enabled batches. Other batches may be referred to as non-GNSS-enabled batches. In additional embodiments, the geolocation estimation process may be performed for the GNSS-enabled batches first. Once the geolocation of the network devices in the GNSS-enabled batches has been estimated, the geolocation estimation process may be performed for the non-GNSS-enabled batches, where cross-batch inter-network device ranging measurements between network devices in the non-GNSS-enabled batches and network devices in the GNSS-enabled batches (the geolocation of the network devices in the GNSS-enabled batches having been estimated) can be utilized for the geolocation estimation for the non-GNSS-enabled batches. In further embodiments, cross-batch inter-network device ranging measurements between network devices in the non-GNSS-enabled batches and the anchor network devices in the GNSS-enabled batches can be utilized for the geolocation estimation for the non-GNSS-enabled batches.

Aspects of the present disclosure may be embodied as an apparatus, system, method, or computer program product. Accordingly, aspects of the present disclosure may take the form of an entirely hardware embodiment, an entirely software embodiment (including firmware, resident software, micro-code, or the like) or an embodiment combining software and hardware aspects that may all generally be referred to herein as a "function," "module," "apparatus," or "system." Furthermore, aspects of the present disclosure may take the form of a computer program product embodied in one or more non-transitory computer-readable storage media storing computer-readable and/or executable program code. Many of the functional units described in this specification have been labeled as functions, in order to emphasize their implementation independence more particularly. For example, a function may be implemented as a hardware circuit comprising custom very large-scale integration (VLSI) circuits or gate arrays, off-the-shelf semiconductors such as logic chips, transistors, or other discrete components. A function may also be implemented in programmable hardware devices such as via field programmable gate arrays, programmable array logic, programmable logic devices, or the like.

Functions may also be implemented at least partially in software for execution by various types of processors. An identified function of executable code may, for instance, comprise one or more physical or logical blocks of computer instructions that may, for instance, be organized as an object, procedure, or function. Nevertheless, the executables of an identified function need not be physically located together but may comprise disparate instructions stored in different locations which, when joined logically together, comprise the function and achieve the stated purpose for the function.

Indeed, a function of executable code may include a single instruction, or many instructions, and may even be distributed over several different code segments, among different programs, across several storage devices, or the like. Where a function or portions of a function are implemented in software, the software portions may be stored on one or more computer-readable and/or executable storage media. Any combination of one or more computer-readable storage media may be utilized. A computer-readable storage medium may include, for example, but not limited to, an electronic, magnetic, optical, electromagnetic, infrared, or semiconductor system, apparatus, or device, or any suitable combination of the foregoing, but would not include propagating signals. In the context of this document, a computer readable and/or executable storage medium may be any tangible and/or non-transitory medium that may contain or store a program for use by or in connection with an instruction execution system, apparatus, processor, or device.

Computer program code for carrying out operations for aspects of the present disclosure may be written in any combination of one or more programming languages, including an object-oriented programming language such as Python, Java, Smalltalk, C++, C#, Objective C, or the like, conventional procedural programming languages, such as the "C" programming language, scripting programming languages, and/or other similar programming languages. The program code may execute partly or entirely on one or more of a user's computer and/or on a remote computer or server over a data network or the like.

A component, as used herein, comprises a tangible, physical, non-transitory device. For example, a component may be implemented as a hardware logic circuit comprising custom VLSI circuits, gate arrays, or other integrated circuits; off-the-shelf semiconductors such as logic chips, transistors, or other discrete devices; and/or other mechanical or electrical devices. A component may also be implemented in programmable hardware devices such as field programmable gate arrays, programmable array logic, programmable logic devices, or the like. A component may comprise one or more silicon integrated circuit devices (e.g., chips, die, die planes, packages) or other discrete electrical devices, in electrical communication with one or more other components through electrical lines of a printed circuit board (PCB) or the like. Each of the functions and/or modules described herein, in certain embodiments, may alternatively be embodied by or implemented as a component.

A circuit, as used herein, comprises a set of one or more electrical and/or electronic components providing one or more pathways for electrical current. In certain embodiments, a circuit may include a return pathway for electrical current, so that the circuit is a closed loop. In another embodiment, however, a set of components that does not include a return pathway for electrical current may be referred to as a circuit (e.g., an open loop). For example, an integrated circuit may be referred to as a circuit regardless of whether the integrated circuit is coupled to ground (as a return pathway for electrical current) or not. In various embodiments, a circuit may include a portion of an integrated circuit, an integrated circuit, a set of integrated circuits, a set of non-integrated electrical and/or electrical components with or without integrated circuit devices, or the like. In one embodiment, a circuit may include custom VLSI circuits, gate arrays, logic circuits, or other integrated circuits; off-the-shelf semiconductors such as logic chips, transistors, or other discrete devices; and/or other mechanical or electrical devices. A circuit may also be implemented as a synthesized circuit in a programmable hardware device such as field programmable gate array, programmable array logic, programmable logic device, or the like (e.g., as firmware, a netlist, or the like). A circuit may comprise one or more silicon integrated circuit devices (e.g., chips, die, die planes, packages) or other discrete electrical devices, in electrical communication with one or more other components through electrical lines of a printed circuit board (PCB) or the like. Each of the functions and/or modules described herein, in certain embodiments, may be embodied by or implemented as a circuit.

Reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to", unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Further, as used herein, reference to reading, writing, storing, buffering, and/or transferring data can include the entirety of the data, a portion of the data, a set of the data, and/or a subset of the data. Likewise, reference to reading, writing, storing, buffering, and/or transferring non-host data can include the entirety of the non-host data, a portion of the non-host data, a set of the non-host data, and/or a subset of the non-host data.

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps, or acts are in some way inherently mutually exclusive.

Aspects of the present disclosure are described below with reference to schematic flowchart diagrams and/or schematic block diagrams of methods, apparatuses, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a computer or other programmable data processing apparatus to produce a machine, such that the instructions, which execute via the processor or other programmable data processing apparatus, create means for implementing the functions and/or acts specified in the schematic flowchart diagrams and/or schematic block diagrams block or blocks.

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures. Although various arrow types and line types may be employed in the flowchart and/or block diagrams, they are understood not to limit the scope of the corresponding embodiments. For instance, an arrow may indicate a waiting or monitoring period of unspecified duration between enumerated steps of the depicted embodiment.

In the following detailed description, reference is made to the accompanying drawings, which form a part thereof. The foregoing summary is illustrative only and is not intended to be in any way limiting. In addition to the illustrative aspects, embodiments, and features described above, further aspects, embodiments, and features will become apparent by reference to the drawings and the following detailed description. The description of elements in each figure may refer to elements of proceeding figures. Like numbers may refer to like elements in the figures, including alternate embodiments of like elements.

Referring to FIG. 1, a diagram illustrating a system environment 100 in accordance with various embodiments of the disclosure is shown. The embodiments depicted in FIG. 1 show the geolocation estimation process for network devices (e.g., APs) using both pseudorange measurements from GNSS satellites and terrestrial-based inter-network device ranging measurements between network devices. The pseudorange measurements from GNSS satellites and the terrestrial-based inter-network device ranging measurements may be fused together in the geolocalization process. The network devices 102*a*-1 may be positioned indoors. In many embodiments, at least some of the network devices 102*a*-1 may each be equipped with a GNSS receiver that collects pseudorange data from satellite links. By way of a non-limiting example, the network device 102*d* can make pseudorange measurements to observable GNSS satellites 104*a* and 104*b*. In the embodiments shown in FIG. 1, due to the presence of obstacles, just network devices 102*e*, 102*i*, 102*d*, and 1021 may be able to observe GNSS satellites. By way of a non-limiting example, an outdoor obstacle 106*a* (e.g., a building) can obstruct the network device 102*a* from observing any GNSS satellites. Each network device collecting pseudorange data can report the respective pseudorange data to the location server 108.

In a number of embodiments (not shown), the location server 108 may be co-located or implemented at one of the network devices being geolocalized. In a variety of embodiments, the network devices 102*a*-1 can also obtain and collect terrestrial-based inter-network device ranging measurements (e.g., based on FTM, UWB, or HADM, etc.) between each other. By way of a non-limiting example, the network device 102*a* may have inter-network device ranging measurement links with the network devices 102*b*, 102*g*, and 102*e*. The formation of inter-network device ranging measurement links can be affected by the distance between network devices and/or by obstacles. By way of a non-limiting example, an indoor obstacle 106*b* can prevent the establishment of inter-network device ranging measurement links between certain pairs of devices (e.g., between the network device 102*e* and each of the network devices 102*b*, 102*f*, or 102*j*).

In some embodiments, a solver/estimator, such as, but not limited to, a least squares (LS) estimator or a maximum likelihood (ML) estimator can be utilized for the geopositioning process. In particular, the location server 108 may perform the calculations to determine the geolocations of the network devices 102*a*-1 based on fused GNSS pseudorange measurements and inter-network device ranging measurements.

In more embodiments, in a post-processing or filtering operation, the location solver can calculate the total range residual error per node (e.g., per network device). In additional embodiments, a network device may be selected as an anchor network device based on the number of (average) observable satellites at the network device and/or the number of inter-network device ranging measurement links to other network devices at the network device. Therefore, by way of a non-limiting example, network devices 102*d*, 102*f*, 102*g*, 102*i*, and 1021 may be selected as anchor network devices based on their higher number of observable satellites and/or higher number of inter-network device ranging measurement links.

As the number of network devices (e.g., network devices 102) increases, the complexity of the geolocation process can escalate exponentially. This may be due to the fact that the optimization problem that needs to be solved can grow increasingly more difficult with each additional network device. The exponential growth in computational complexity may necessitate substantial computational resources, making the geolocation process time-consuming and resource-intensive, or even impractical. To manage the escalating computational complexity, in further embodiments, the network devices (e.g., network devices 102) can be divided into smaller batches, as will be described in further detail below. The geolocation process may then be performed on a batch-by-batch basis. By tackling the geolocation of network devices in this manner, the computational complexity can be effectively managed.

Although a specific embodiment for a system environment suitable for carrying out the various steps, processes, methods, and operations described herein is discussed with respect to FIG. 1, any of a variety of systems and/or processes may be utilized in accordance with embodiments of the disclosure. For example, the network devices can be equipped with advanced GNSS receivers capable of receiving signals from multiple satellite systems simultaneously, thereby increasing the number of observable satellites and enhancing the accuracy of geolocation estimation. The elements depicted in FIG. 1 may also be interchangeable with other elements of FIGS. 2-8 as required to realize a particularly desired embodiment.

Figure 2:
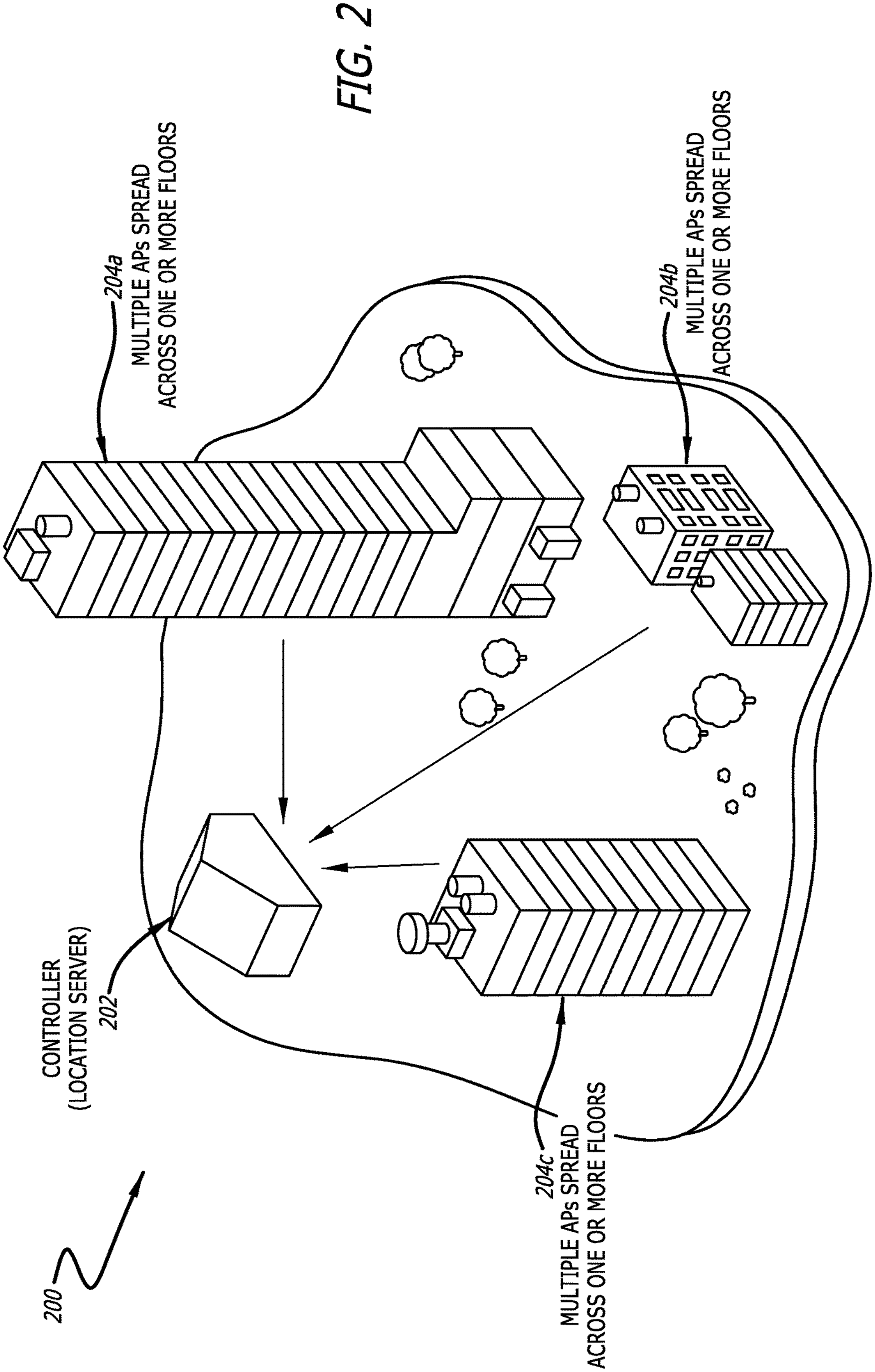
FIG. 2 is a diagram illustrating an environment in accordance with various embodiments of the disclosure.

Referring to FIG. 2, a diagram illustrating an environment 200 in accordance with various embodiments of the disclosure is shown. In the embodiments shown in FIG. 2, multiple network devices (e.g., APs) deployed indoors in the three buildings 204*a*, 204*b*, and 204*c* of a campus (e.g., an enterprise campus) may be under the management of the controller 202. In many embodiments, the controller 202 may implement a location server. Each of the buildings 204*a*, 204*b*, and 204*c* can house multiple network devices (e.g., hundreds of network devices) spread across one or more floors.

In the depicted embodiments, the controller 202 may serve as the central hub for managing the geolocalization of network devices within the campus. In a number of embodiments, the location server implemented at the controller 202 can partition the network devices into groups or batches and then estimate their geolocation on a batch-by-batch basis. This approach may help to manage the computational complexity that can arise when the number of network devices increases. By way of a non-limiting example, depending on the type of optimization problem the solver utilizes, it can take hours to complete the processing involved in the geolocation estimation process for 1000 network devices if all the network devices are localized in a single batch.

In a variety of embodiments, the partitioning of network devices can be based on various factors such as, but not limited to, the proximity of the network devices to each other (i.e., the neighbor knowledge), the connectivity between the network devices, or the floor of the building the network devices are located on. In some embodiments, the neighbor knowledge may be obtained based on techniques such as, but not limited to, NDP or RSSI measurements. By way of a non-limiting example, strong RSSIs between two network devices may indicate that the two devices are close to each other. By way of another non-limiting example, similar RSSIs at a third location (e.g., at the controller 202) for signals from two similar network devices may indicate that the two devices are close to each other. In more embodiments, a batch of network devices may include just network devices that are located on a same floor of the building (e.g., a 2D scenario). In additional embodiments, a batch of network devices may include network devices that are located across different floors of the building (e.g., a 3D scenario). In further embodiments, the floor on which a network device is located may be determined based on one or more air pressure readings from an air pressure sensor implemented in the network device (e.g., the air pressure may be lower on higher floors).

Although a specific embodiment for an environment suitable for carrying out the various steps, processes, methods, and operations described herein is discussed with respect to FIG. 2, any of a variety of systems and/or processes may be utilized in accordance with embodiments of the disclosure. For example, the controller can be a dedicated server or a cloud-based system. The elements depicted in FIG. 2 may also be interchangeable with other elements of FIGS. 1 and 3-8 as required to realize a particularly desired embodiment.

Figure 3:
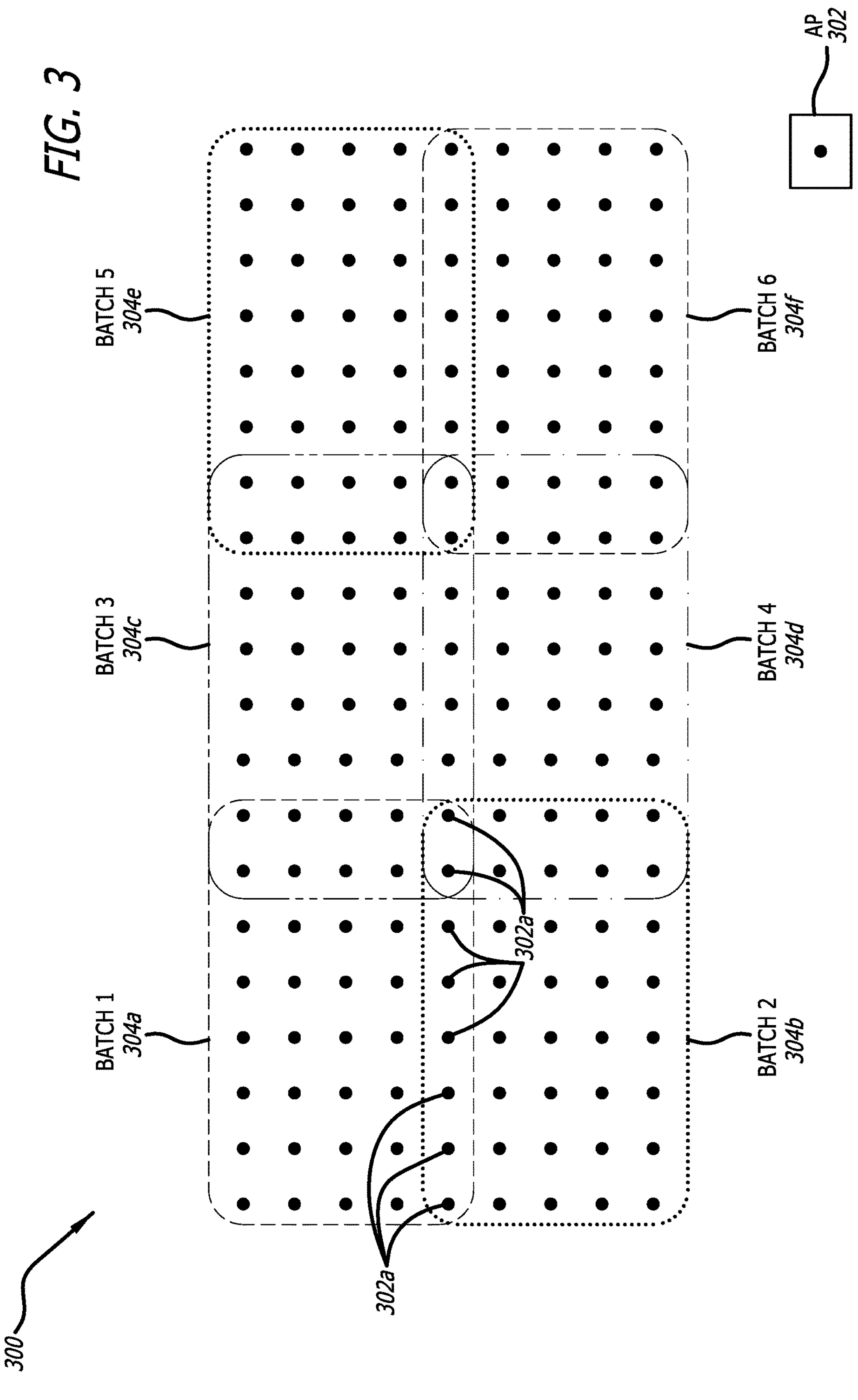
FIG. 3 is a diagram illustrating partitioning of a set of network devices into batches in accordance with various embodiments of the disclosure.

Referring to FIG. 3, a diagram 300 illustrating partitioning of a set of network devices into batches in accordance with various embodiments of the disclosure is shown. The embodiments shown in FIG. 3 include 160 network devices 302 (e.g., APs). The network devices 302 may be located on the same floor. As shown, the network devices 302 may be divided into six batches: batch 1 304*a*, batch 2 304*b*, batch 3 304*c*, batch 4 304*d*, batch 5 304*e*, and batch 6 304*f*. Batch 1 304*a*, batch 3 304*c*, and batch 5 304*e* may each contain 40 network devices 302, while batch 2 304*b*, batch 4 304*d*, and batch 6 304*f* may each contain 32 network devices. Furthermore, neighboring batches can share common network devices. By way of a non-limiting example, 8 network devices 302*a* may be common to both batch 1 304*a* and batch 2 304*b*.

In many embodiments, the geolocation of network devices 302 can be estimated in a batch-by-batch fashion to manages the computational complexity. In a number of embodiments, when the batches are being identified (e.g., by a location server implemented at a controller), initial batches may be identified based on an attempt to maximize the number of anchor network devices included in the batches while making sure any batch size limit specification is complied with. Further batches of network devices can be identified based on common network devices between one or more already-identified batches and the additional batch being identified. In a variety of embodiments, the common network devices can be utilized for sequential anchoring in the geolocation process. By way of a non-limiting example, the geolocation of the common network devices 302*a* may be estimated when the geolocation of network devices in batch 1 304*a* is estimated. Thereafter, the estimated geolocation of the common network devices 302*a* can be utilized in the estimation of the geolocation of network devices in batch 2 304*b*.

In some embodiments, common network devices can be utilized for the evaluation of the accuracy of the geolocation estimation. By way of a non-limiting example, the estimated geolocation of the common network devices 302*a* according to the geolocation estimation process for batch 1 304*a* can be compared against the estimated geolocation of the same common network devices 302*a* according to the geolocation estimation process for batch 2 304*b*. A large difference (e.g., a difference greater than a threshold) may indicate the inaccuracy of the geolocation estimation for at least one of batch 1 304*a* or batch 2 304*b*.

In more embodiments, if the average residual error is large for two partitions that have common network devices (e.g., batch 1 304*a* and batch 2 304*b*) and if the two partitions each have enough non-common anchor network devices, the accuracy of the geolocation estimation for the two partitions may be improved based on iterating between the geolocation estimation processes for the two partitions. In particular, the uncertainty region (e.g., a degree of uncertainty) for just the common network devices can be considered during the iterative process. The process may be repeated until the geolocation estimations obtained from the geolocation estimation process for both batches converge (e.g., until the average residual error is less than a threshold).

Although a specific embodiment for partitioning of a set of network devices into batches suitable for carrying out the various steps, processes, methods, and operations described herein is discussed with respect to FIG. 3, any of a variety of systems and/or processes may be utilized in accordance with embodiments of the disclosure. For example, the network devices may be various types of devices such as routers, switches, or wireless APs that need to be geolocated. The elements depicted in FIG. 3 may also be interchangeable with other elements of FIGS. 1, 2 and 4-8 as required to realize a particularly desired embodiment.

Figure 4:
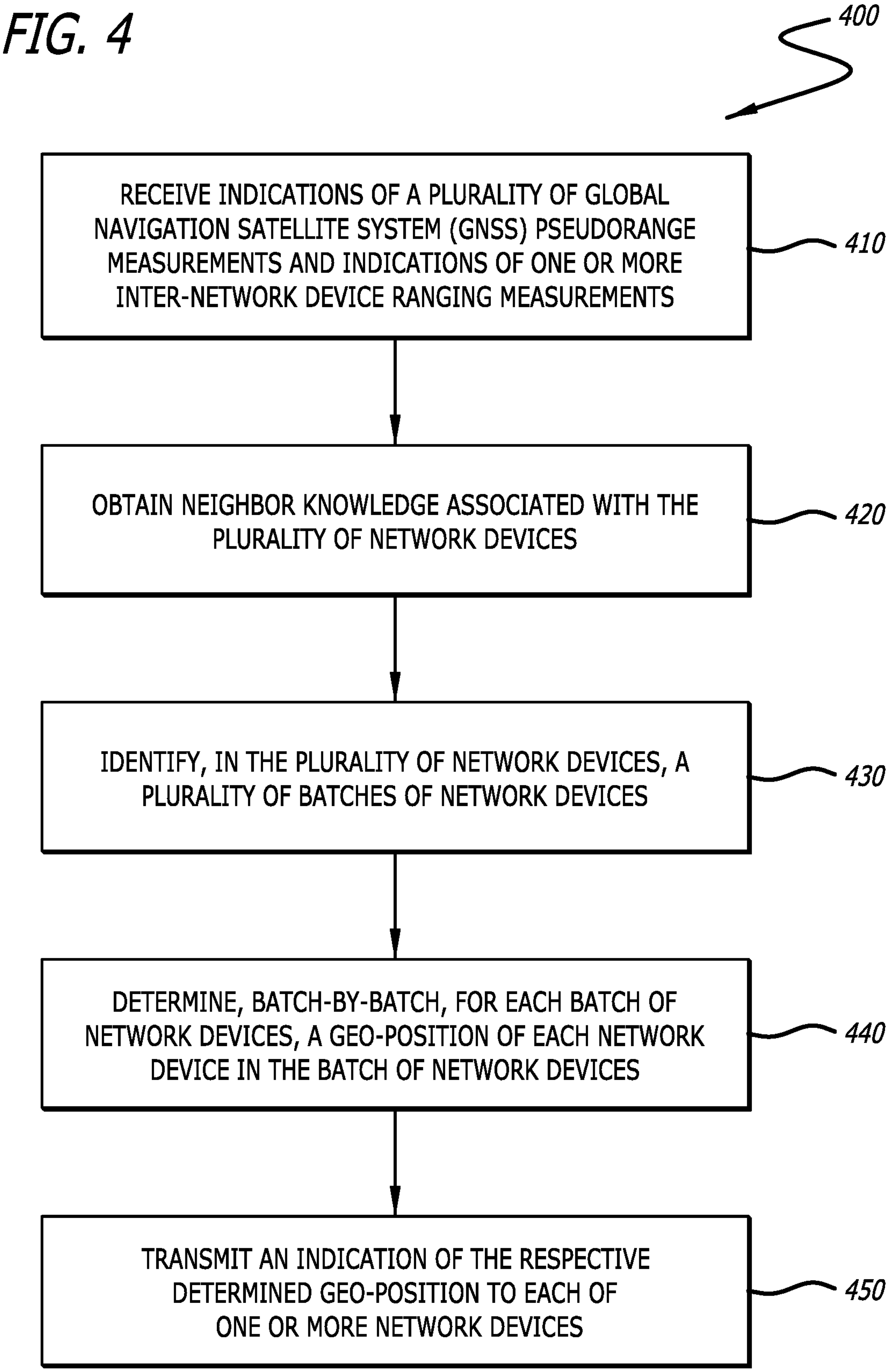
FIG. 4 is a flowchart showing a process for identifying batches of network devices and determining their geo-positions in accordance with various embodiments of the disclosure.

Referring to FIG. 4, a flowchart showing a process 400 for identifying batches of network devices and determining their geo-positions in accordance with various embodiments of the disclosure is shown. In many embodiments, the process 400 may receive indications of a plurality of GNSS pseudorange measurements and indications of one or more inter-network device ranging measurements (block 410). The GNSS pseudorange measurements may be associated with a first subset of network devices in a plurality of network devices. The inter-network device ranging measurements can be associated with a second subset of network devices in the plurality of network devices. The GNSS pseudorange measurements can be obtained from GNSS receivers in the network devices, while the inter-network device ranging measurements can be obtained based on communication exchanges between the network devices.

In a number of embodiments, the process 400 can obtain neighbor knowledge associated with the plurality of network devices (block 420). The neighbor knowledge can include data about the proximity and relative positions of network devices to each other. The neighbor knowledge can be based on various sources such as, but not limited to, air pressure readings, NDP packets, or RSSI measurements.

In a variety of embodiments, the process 400 can identify, in the plurality of network devices, a plurality of batches of network devices (block 430). The identification of batches can be based on various factors such as, but not limited to, the neighbor knowledge, the connectivity between network devices, or the distribution of network devices. Each batch can include a subset of the network devices and can be processed separately by the solver. In some embodiments, each batch of network devices may include at least one anchor network device. In more embodiments, each batch of network devices in the plurality of batches of network devices include at most a predetermined number of network devices.

In additional embodiments, the process 400 can determine, batch-by-batch, for each batch of network devices, a geo-position of each network device in the batch of network devices (block 440). The geo-position determination can be based on at least a subset of the received GNSS pseudorange measurements or a subset of the inter-network device ranging measurements. In further embodiments, a solver/estimator, such as, but not limited to, an LS estimator or a maximum likelihood (ML) estimator can be utilized for the geo-positioning process.

In still more embodiments, the process 400 can transmit an indication of the respective determined geo-position to each of the one or more network devices (block 450). The transmission of the geo-position data can be executed via a network interface controller. In still further embodiments, the network devices can use the received geo-position data for various location-dependent functionalities, such as, but not limited to, providing location-based services or optimizing network performance.

Although a specific embodiment for identifying batches of network devices and determining their geo-positions suitable for carrying out the various steps, processes, methods, and operations described herein is discussed with respect to FIG. 4, any of a variety of systems and/or processes may be utilized in accordance with embodiments of the disclosure. For example, the process can be implemented in a large-scale data center, where the geo-position data may be used to manage and optimize the placement and connectivity of servers and other network equipment. The elements depicted in FIG. 4 may also be interchangeable with other elements of FIGS. 1-3 and 5-8 as required to realize a particularly desired embodiment.

Figure 5:
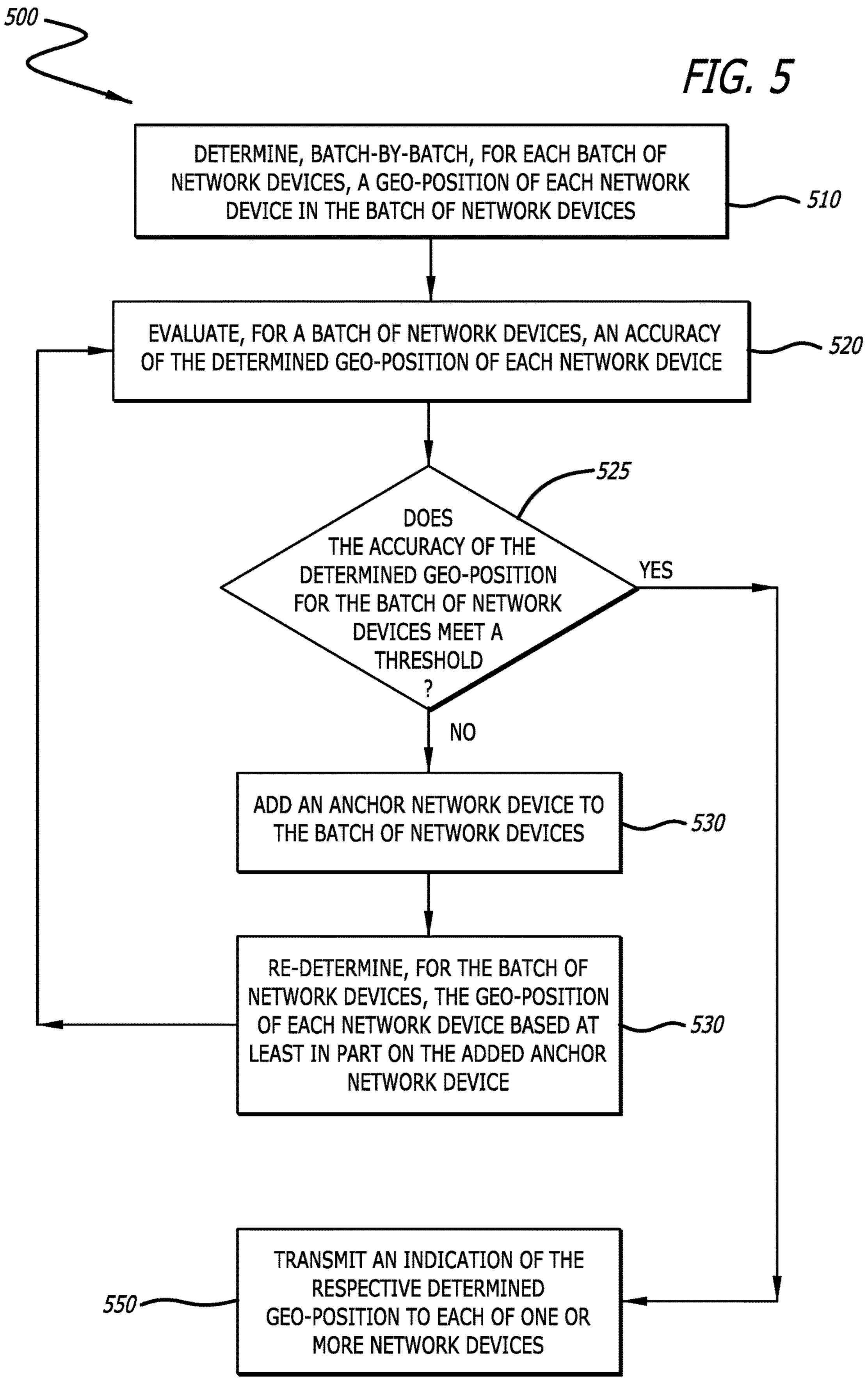
FIG. 5 is a flowchart showing a process for determining and evaluating the geo-position of network devices in a batch-by-batch manner in accordance with various embodiments of the disclosure.

Referring to FIG. 5, a flowchart showing a process 500 for determining and evaluating the geo-position of network devices in a batch-by-batch manner in accordance with various embodiments of the disclosure is shown. In many embodiments, the process 500 may determine, batch-by-batch, for each batch of network devices, a geo-position of each network device in the batch of network devices (block 510). The geo-position determination can be based on at least a subset of a plurality of GNSS pseudorange measurements associated with the batch of network devices and/or at least a subset of one or more inter-network device ranging measurements associated with the batch of network devices. In a number of embodiments, a solver/estimator, such as, but not limited to, an LS estimator or a maximum likelihood (ML) estimator can be utilized for the geo-positioning process.

In a variety of embodiments, the process 500 can evaluate, for a batch of network devices, an accuracy of the determined geo-position of each network device (block 520). The evaluation can be based on comparing the determined geo-position with a known location. In some embodiments, the evaluation may involve statistical or machine learning processes to quantify the accuracy of the geo-position determination.

In more embodiments, the process 500 can determine if the accuracy of the determined geo-position for the batch of network devices meets a threshold (block 525). In additional embodiments, when the accuracy of the determined geo-position for the batch of network devices meets the threshold, the process 500 can transmit an indication of the respective determined geo-position to each of the one or more network devices. However, in further embodiments, in response to the accuracy of the determined geo-position for the batch of network devices not meeting the threshold, the process 500 can add an anchor network device to the batch of network devices.

In still more embodiments, the process 500 can add an anchor network device to the batch of network devices (block 530). In still further embodiments, the anchor network device can be a device with a known or highly accurate geo-position. In still additional embodiments, the anchor network device may be a device associated with a sufficient number of observable GNSS satellites.

In some more embodiments, the process 500 can re-determine, for the batch of network devices, the geo-position of each network device based at least in part on the added anchor network device (block 540). The re-determination process can be performed using updated measurement data that includes data from the added anchor network device. In certain embodiments, the re-determination process can include using the known geo-position of the anchor network device to improve the accuracy of the geo-position determination for the other network devices in the batch.

In yet more embodiments, when the accuracy of the determined geo-position for the batch of network devices meets the threshold, the process 500 can transmit an indication of the respective determined geo-position to each of the one or more network devices (block 550). The transmission can be executed via a network interface controller. In still yet more embodiments, the network devices can use the geo-position data for various location-dependent functionalities, such as, but not limited to, providing location-based services, or optimizing network performance.

Although a specific embodiment for determining and evaluating the geo-position of network devices in a batch-by-batch manner suitable for carrying out the various steps, processes, methods, and operations described herein is discussed with respect to FIG. 5, any of a variety of systems and/or processes may be utilized in accordance with embodiments of the disclosure. For example, the process may be applied in a large-scale wireless network, such as, but not limited to, a city-wide Wi-Fi network, where the network devices may be Wi-Fi hotspots distributed across various locations in the city. The elements depicted in FIG. 5 may also be interchangeable with other elements of FIGS. 1-4 and 6-8 as required to realize a particularly desired embodiment.

Figure 6:
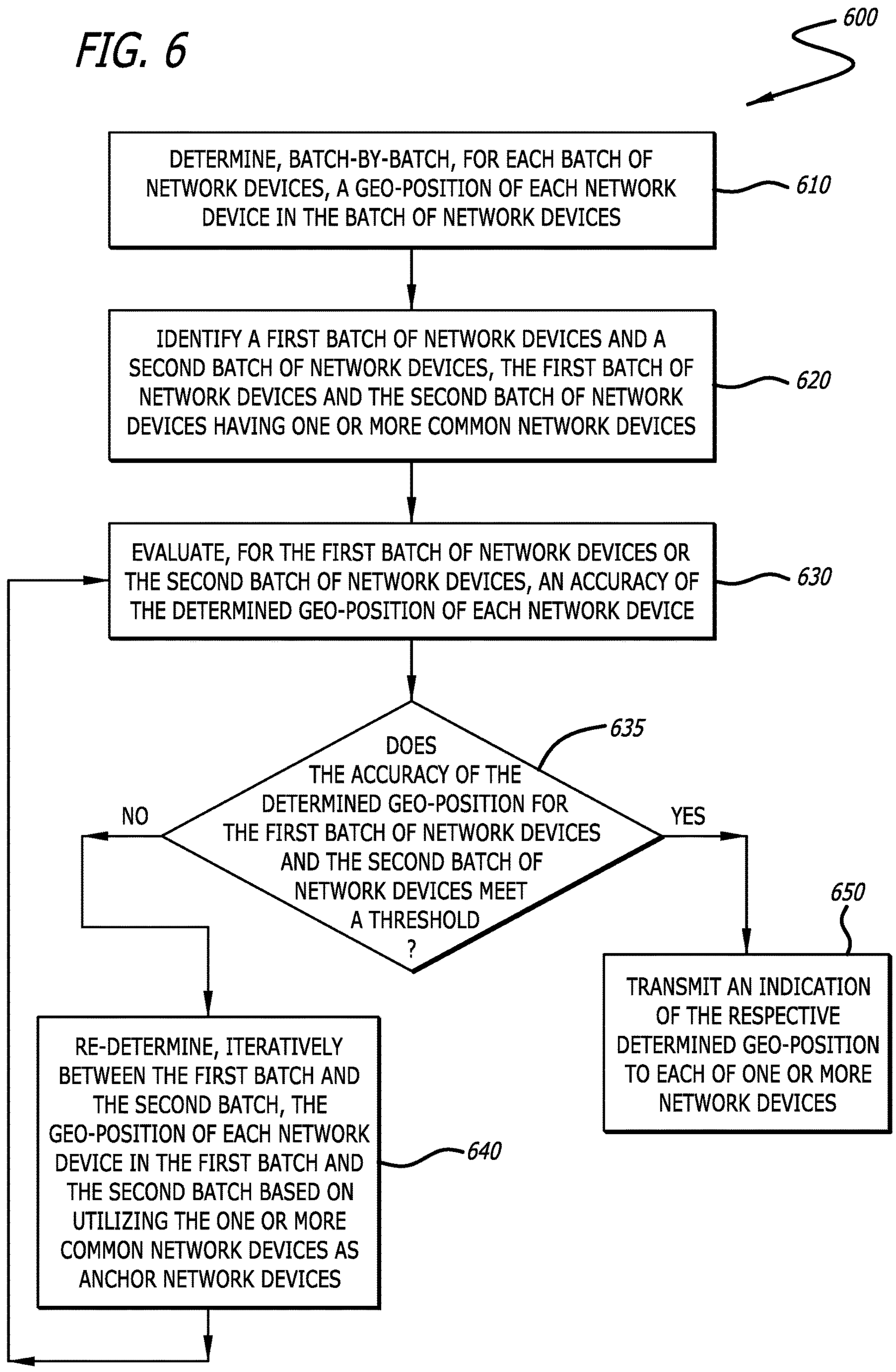
FIG. 6 is a flowchart showing a process for determining and evaluating the geo-position of network devices in a batch-by-batch manner in accordance with various embodiments of the disclosure.

Referring to FIG. 6, a flowchart showing a process 600 for determining and evaluating the geo-position of network devices in a batch-by-batch manner in accordance with various embodiments of the disclosure is shown. In many embodiments, the process 600 may determine, batch-by-batch, for each batch of network devices, a geo-position of each network device in the batch of network devices (block 610). The geo-position determination can be based on at least a subset of a plurality of GNSS pseudorange measurements associated with the batch of network devices and/or at least a subset of one or more inter-network device ranging measurements associated with the batch of network devices. In a number of embodiments, a solver/estimator, such as, but not limited to, an LS estimator or a maximum likelihood (ML) estimator can be utilized for the geo-positioning process.

In a variety of embodiments, the process 600 can identify a first batch of network devices and a second batch of network devices in the plurality of batches of network devices (block 620). The first batch of network devices and the second batch of network devices may have one or more common network devices. As will be described in further detail below, the common network devices may be utilized to evaluate the accuracy of the geo-position estimation for the first and the second batches of network devices, as well as serve as anchor network devices in an iterative geo-position re-determination process to improve the accuracy of the geo-position estimation when the accuracy of the geo-position estimation is less than satisfactory.

In some embodiments, the process 600 can evaluate, for the first batch of network devices or the second batch of network devices, an accuracy of the determined geo-position of each network device (block 630). In more embodiments, the evaluation may be based on the common network devices. In additional embodiments, the evaluation may involve statistical or machine learning processes to quantify the accuracy of the geo-position determination.

In further embodiments, the process 600 can determine if the accuracy of the determined geo-position for the first batch of network devices and the second batch of network devices meets a threshold (block 635). In still more embodiments, when the accuracy of the determined geo-position for the first batch of network devices and the second batch of network devices meets the threshold, the process 600 can transmit an indication of the respective determined geo-position to each of one or more network devices. However, in still further embodiments, in response to the accuracy of the determined geo-position for the first batch of network devices and/or the second batch of network devices not meeting the threshold, the process 600 can re-determine, iteratively between the first batch and the second batch, the geo-position of each network device in the first batch and the second batch based on utilizing the one or more common network devices as anchor network devices.

In still additional embodiments, in response to the accuracy of the determined geo-position for the first batch of network devices and/or the second batch of network devices not meeting the threshold, the process 600 can re-determine, iteratively between the first batch and the second batch, the geo-position of each network device in the first batch and the second batch based on utilizing the one or more common network devices as anchor network devices (block 640). By way of a non-limiting example, in particular, the geo-position of the network devices may be estimated for the first batch. Then, when the geo-position of network devices in the second batch is being estimated, the geo-position estimation for the common network devices that was obtained from the geo-positioning process for the first batch can be utilized, and the uncertainty region for just the common network devices may be considered. Thereafter, the geo-position of network devices in the first batch can be estimated again, where the geo-position estimation for the common network devices that was obtained from the geo-positioning process for the second batch can be utilized, and the uncertainty region for just the common network devices (which may be smaller uncertainty regions) may be considered. The process may be repeated until the geo-position estimations obtained from the geo-positioning process for both batches converge (e.g., until the average residual error is less than a threshold).

In some more embodiments, when the accuracy of the determined geo-position for the first batch of network devices and the second batch of network devices meets the threshold, the process 600 can transmit an indication of the respective determined geo-position to each of one or more network devices (block 650). The transmission can be executed via a network interface controller. In certain embodiments, the network devices can use the geo-position data for various location-dependent functionalities, such as, but not limited to, providing location-based services or optimizing network performance.

Although a specific embodiment for determining and evaluating the geo-position of network devices in a batch-by-batch manner suitable for carrying out the various steps, processes, methods, and operations described herein is discussed with respect to FIG. 6, any of a variety of systems and/or processes may be utilized in accordance with embodiments of the disclosure. For example, the process may be implemented in a network of environmental sensors distributed across a large geographical area, where the geo-position data can be used to correlate sensor readings with specific locations for more accurate environmental monitoring. The elements depicted in FIG. 6 may also be interchangeable with other elements of FIGS. 1-5, 7, and 8 as required to realize a particularly desired embodiment.

Figure 7:
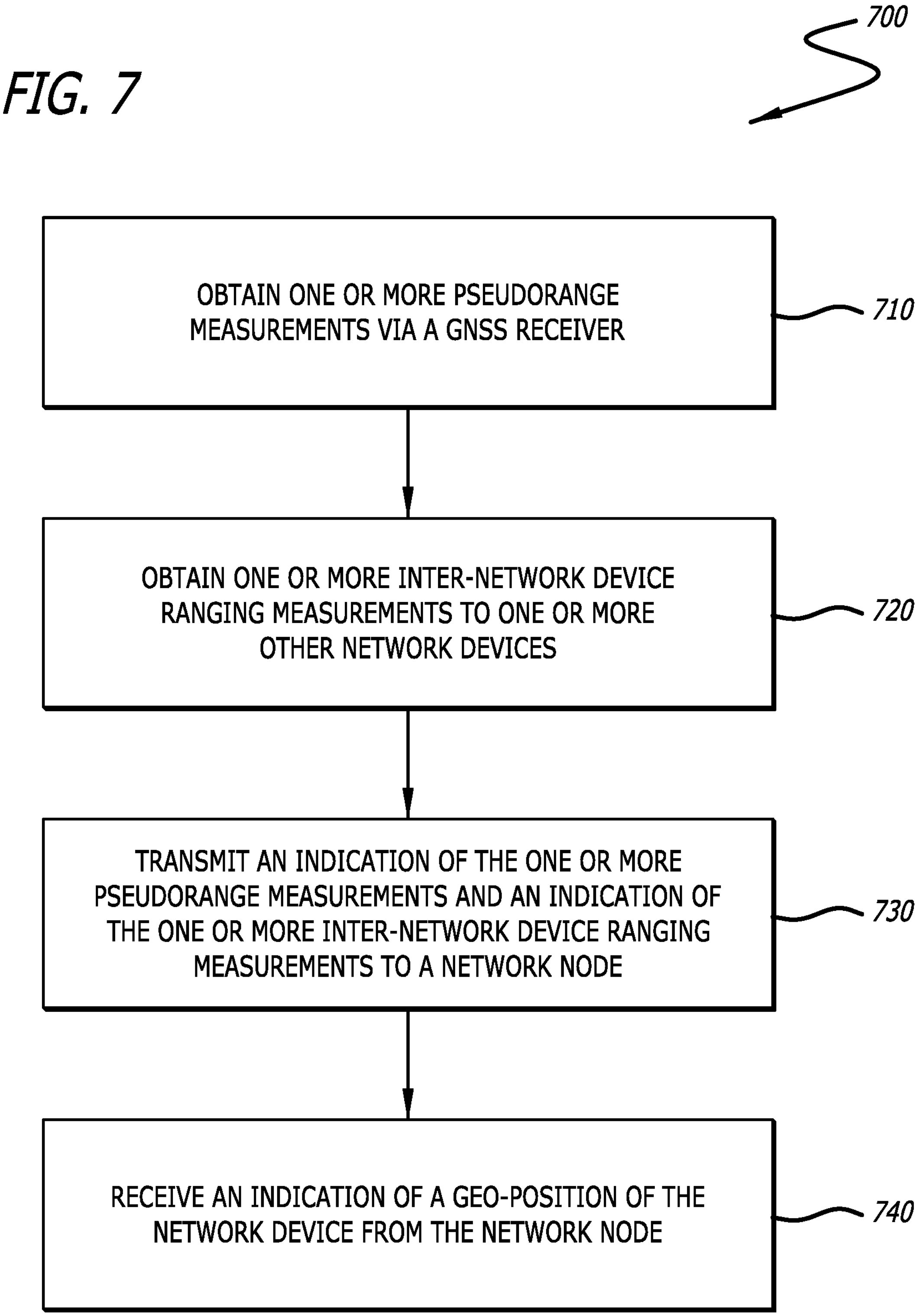
FIG. 7 is a flowchart showing a process for estimating the geolocation of a network device in accordance with various embodiments of the disclosure.

Referring to FIG. 7, a flowchart showing a process 700 for estimating the geolocation of a network device in accordance with various embodiments of the disclosure is shown. In many embodiments, the process 700 can obtain one or more pseudorange measurements via a GNSS receiver (block 710). These pseudorange measurements can be obtained from signals received from GNSS satellites. The pseudorange measurements can be associated with one or more of quality metrics, timestamps, or satellite/constellation identifiers (IDs).

In a number of embodiments, the process 700 can obtain one or more inter-network device ranging measurements to one or more other network devices (block 720). The measurements can be obtained from signals exchanged between network devices. Further, the measurements can be based on techniques such as, but not limited to, FTM, UWB, or HADM. The inter-network device ranging measurements can relate to the relative distances between network devices.

In a variety of embodiments, the process 700 can transmit an indication of the one or more pseudorange measurements and an indication of the one or more inter-network device ranging measurements to a network node (block 730). The transmission can be carried out over a network connection. The network node may correspond to a location server, a controller, and so on. The network node may be co-located or implemented at another network device being geolocalized, or may be implemented at a remote device not being geolocalized. The network node can use the measurements to estimate the geolocation of the network device.

In some embodiments, the process 700 can receive an indication of a geo-position of the network device from the network node (block 740). The geo-position can be based on the pseudorange measurements and the inter-network device ranging measurements. The network device can use the received geo-position for various applications, such as, but not limited to, location-based services.

Although a specific embodiment for estimating the geolocation of a network device suitable for carrying out the various steps, processes, methods, and operations described herein is discussed with respect to FIG. 7, any of a variety of systems and/or processes may be utilized in accordance with embodiments of the disclosure. For example, the network devices may be selectively activated based on their signal quality, thereby optimizing the use of network resources and improving the accuracy of the geolocation estimation. The elements depicted in FIG. 7 may also be interchangeable with other elements of FIGS. 1-6 and 8 as required to realize a particularly desired embodiment.

Figure 8:
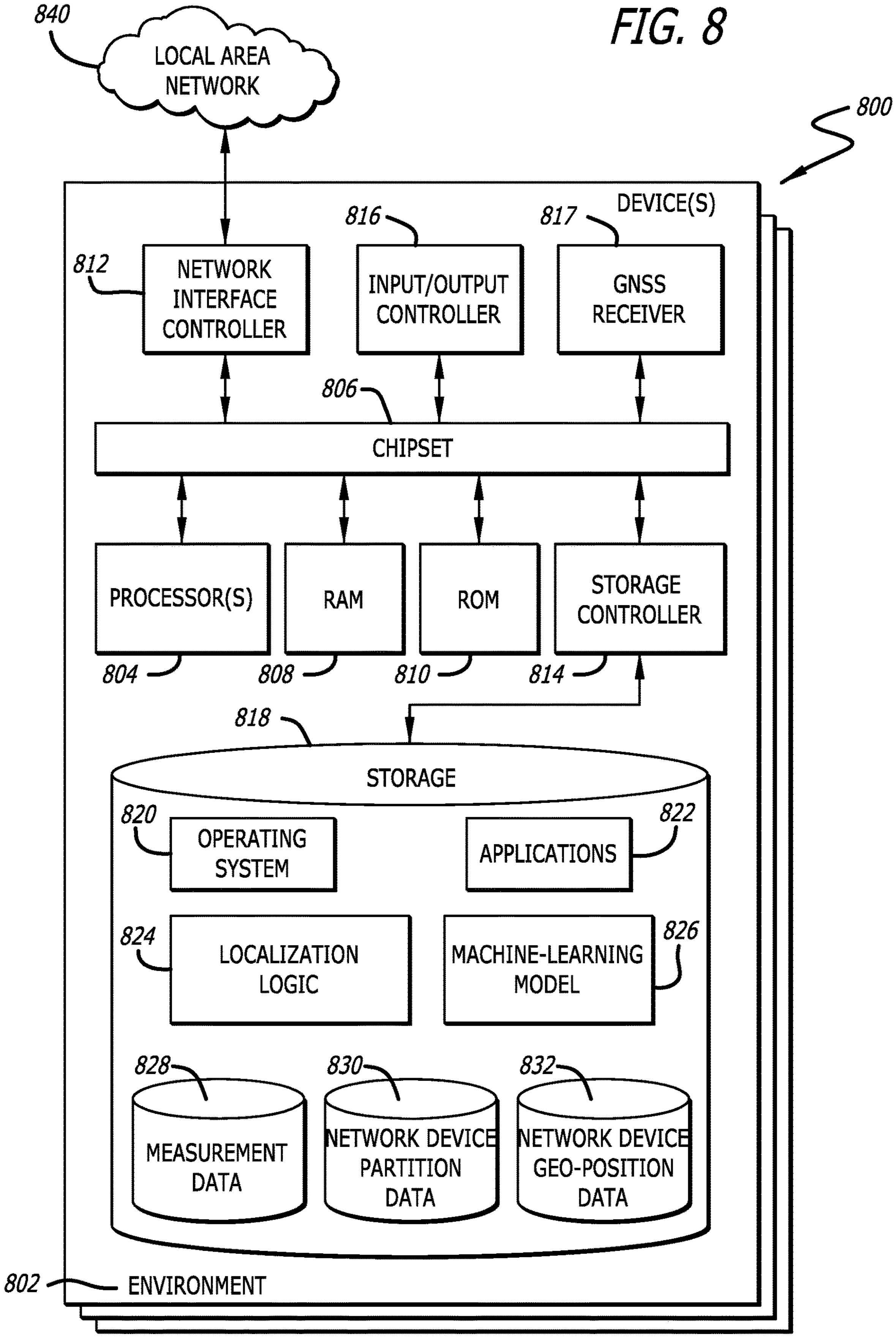
FIG. 8 is a conceptual block diagram for one or more devices capable of executing components and logic for implementing the functionality and embodiments described above.

Referring to FIG. 8, a conceptual block diagram for one or more devices 800 capable of executing components and logic for implementing the functionality and embodiments described above is shown. The embodiment of the conceptual block diagram depicted in FIG. 8 can illustrate a conventional server computer, workstation, desktop computer, laptop, tablet, network appliance, e-reader, smartphone, or other computing device, and can be utilized to execute any of the application and/or logic components presented herein. The device 800 may, in some examples, correspond to physical devices or to virtual resources described herein.

In many embodiments, the device 800 may include an environment 802 such as a baseboard or "motherboard," in physical embodiments that can be configured as a printed circuit board with a multitude of components or devices connected by way of a system bus or other electrical communication paths. Conceptually, in virtualized embodiments, the environment 802 may be a virtual environment that encompasses and executes the remaining components and resources of the device 800. In more embodiments, one or more processors 804, such as, but not limited to, central processing units ("CPUs") can be configured to operate in conjunction with a chipset 806. The processor(s) 804 can be standard programmable CPUs that perform arithmetic and logical operations necessary for the operation of the device 800.

In additional embodiments, the processor(s) 804 can perform one or more operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

In certain embodiments, the chipset 806 may provide an interface between the processor(s) 804 and the remainder of the components and devices within the environment 802. The chipset 806 can provide an interface to a random-access memory ("RAM") 808, which can be used as the main memory in the device 800 in some embodiments. The chipset 806 can further be configured to provide an interface to a computer-readable storage medium such as a read-only memory ("ROM") 810 or non-volatile RAM ("NVRAM") for storing basic routines that can help with various tasks such as, but not limited to, starting up the device 800 and/or transferring information between the various components and devices. The ROM 810 or NVRAM can also store other application components necessary for the operation of the device 800 in accordance with various embodiments described herein.

Different embodiments of the device 800 can be configured to operate in a networked environment using logical connections to remote computing devices and computer systems through a network, such as the network 840. The chipset 806 can include functionality for providing network connectivity through a network interface card ("NIC") 812, which may comprise a gigabit Ethernet adapter or similar component. The NIC 812 can be capable of connecting the device 800 to other devices over the network 840. It is contemplated that multiple NICs 812 may be present in the device 800, connecting the device to other types of networks and remote systems.

In further embodiments, the device 800 can be connected to a storage 818 that provides non-volatile storage for data accessible by the device 800. The storage 818 can, for example, store an operating system 820, applications 822, measurement data 828, network device partition data 830, and network device geo-position data 832, which are described in greater detail below. The storage 818 can be connected to the environment 802 through a storage controller 814 connected to the chipset 806. In certain embodiments, the storage 818 can consist of one or more physical storage units. The storage controller 814 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The device 800 can store data within the storage 818 by transforming the physical state of the physical storage units to reflect the information being stored. The specific transformation of physical state can depend on various factors. Examples of such factors can include, but are not limited to, the technology used to implement the physical storage units, whether the storage 818 is characterized as primary or secondary storage, and the like.

For example, the device 800 can store information within the storage 818 by issuing instructions through the storage controller 814 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit, or the like. Other transformations of physical media are possible without departing from the scope and spirit of the present description, with the foregoing examples provided only to facilitate this description. The device 800 can further read or access information from the storage 818 by detecting the physical states or characteristics of one or more particular locations within the physical storage units.

In addition to the storage 818 described above, the device 800 can have access to other computer-readable storage media to store and retrieve information, such as program modules, data structures, or other data. It should be appreciated by those skilled in the art that computer-readable storage media is any available media that provides for the non-transitory storage of data and that can be accessed by the device 800. In some examples, the operations performed by a cloud computing network, and or any components included therein, may be supported by one or more devices similar to device 800. Stated otherwise, some or all of the operations performed by the cloud computing network, and or any components included therein, may be performed by one or more devices 800 operating in a cloud-based arrangement.

By way of example, and not limitation, computer-readable storage media can include volatile and non-volatile, removable, and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage 818 can store an operating system 820 utilized to control the operation of the device 800. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage 818 can store other system or application programs and data utilized by the device 800.

In various embodiment, the storage 818 or other computer-readable storage media is encoded with computer-executable instructions which, when loaded into the device 800, may transform it from a general-purpose computing system into a special-purpose computer capable of implementing the embodiments described herein. These computer-executable instructions may be stored as application 822 and transform the device 800 by specifying how the processor(s) 804 can transition between states, as described above. In some embodiments, the device 800 has access to computer-readable storage media storing computer-executable instructions which, when executed by the device 800, perform the various processes described above with regard to FIGS. 1-7. In more embodiments, the device 800 can also include computer-readable storage media having instructions stored thereupon for performing any of the other computer-implemented operations described herein.

In still further embodiments, the device 800 can also include one or more input/output controllers 816 for receiving and processing input from a number of input devices, such as a keyboard, a mouse, a touchpad, a touch screen, an electronic stylus, or other type of input device. Similarly, an input/output controller 816 can be configured to provide output to a display, such as a computer monitor, a flat panel display, a digital projector, a printer, or other type of output device. Those skilled in the art will recognize that the device 800 might not include all of the components shown in FIG. 8, and can include other components that are not explicitly shown in FIG. 8, or might utilize an architecture completely different than that shown in FIG. 8.

As described above, the device 800 may support a virtualization layer, such as one or more virtual resources executing on the device 800. In some examples, the virtualization layer may be supported by a hypervisor that provides one or more virtual machines running on the device 800 to perform functions described herein. The virtualization layer may generally support a virtual resource that performs at least a portion of the techniques described herein.

In many embodiments, the device 800 can include a localization logic 824. The localization logic 824 may be configured to determine the geolocation of network devices. The localization logic 824 can partition the network devices into multiple batches to manage the computational complexity. The localization logic 824 may apply algorithms to estimate the most probable location of each network device.

In a number of embodiments, the storage 818 can include measurement data 828. The measurement data 828 can include a range of data types used in the geolocation process of network devices. Non-limiting examples can include GNSS pseudorange measurement data and inter-network device ranging measurement data.

In various embodiments, the storage 818 can include network device partition data 830. The network device partition data 830 may relate to the division of network devices into smaller groups or batches for the purpose of geolocation. The network device partition data 830 can include details about which network devices are grouped together in a batch, the common devices between batches, and other relevant data that aids in the batch-by-batch geolocation process.

In still more embodiments, the storage 818 can include network device geo-position data 832. The network device geo-position data 832 may relate to the estimated geographical coordinates of each network device within the system. The network device geo-position data 832 can be the output of the geolocation process and may provide the location of each network device in terms of latitude, longitude, and/or altitude.

Finally, in many embodiments, data may be processed into a format usable by a machine-learning model 826 (e.g., feature vectors), and or other pre-processing techniques. The machine-learning ("ML") model 826 may be any type of ML model, such as supervised models, reinforcement models, and/or unsupervised models. The ML model 826 may include one or more of linear regression models, logistic regression models, decision trees, Naïve Bayes models, neural networks, k-means cluster models, random forest models, and/or other types of ML models 826. The ML model 826 may be configured to learn patterns and relationships from the measurement data 828 and network device partition data 830 to aid in the geolocation process of network devices.

Although the present disclosure has been described in certain specific aspects, many additional modifications and variations would be apparent to those skilled in the art. In particular, any of the various processes described above can be performed in alternative sequences and/or in parallel (on the same or on different computing devices) in order to achieve similar results in a manner that is more appropriate to the requirements of a specific application. It is therefore to be understood that the present disclosure can be practiced other than specifically described without departing from the scope and spirit of the present disclosure. Thus, embodiments of the present disclosure should be considered in all respects as illustrative and not restrictive. It will be evident to the person skilled in the art to freely combine several or all of the embodiments discussed here as deemed suitable for a specific application of the disclosure. Throughout this disclosure, terms like "advantageous", "exemplary" or "example" indicate elements or dimensions which are particularly suitable (but not essential) to the disclosure or an embodiment thereof and may be modified wherever deemed suitable by the skilled person, except where expressly required. Accordingly, the scope of the disclosure should be determined not by the embodiments illustrated, but by the appended claims and their equivalents.

Any reference to an element being made in the singular is not intended to mean "one and only one" unless explicitly so stated, but rather "one or more." All structural and functional equivalents to the elements of the above-described preferred embodiment and additional embodiments as regarded by those of ordinary skill in the art are hereby expressly incorporated by reference and are intended to be encompassed by the present claims.

Moreover, no requirement exists for a system or method to address each and every problem sought to be resolved by the present disclosure, for solutions to such problems to be encompassed by the present claims. Furthermore, no element, component, or method step in the present disclosure is intended to be dedicated to the public regardless of whether the element, component, or method step is explicitly recited in the claims. Various changes and modifications in form, material, workpiece, and fabrication material detail can be made, without departing from the spirit and scope of the present disclosure, as set forth in the appended claims, as might be apparent to those of ordinary skill in the art, are also encompassed by the present disclosure.

What is claimed is:

1. A network node, comprising:

a processor;

at least one network interface controller configured to provide access to a network; and a memory communicatively coupled to the processor, wherein the memory comprises a localization logic that is configured to:

receive a plurality of global navigation satellite system (GNSS) pseudorange measurements associated with a first subset of network devices in a plurality of network devices and one or more inter-network device ranging measurements associated with a second subset of network devices in the plurality of network devices;

partition the plurality of network devices into groups to compute, batch-by-batch, for each batch of network devices, a geo-position of each network device in the batch of network devices based on a subset of the plurality of GNSS pseudorange measurements associated with the batch of network devices or a subset of the one or more inter-network device ranging measurements associated with the batch of network devices;

wherein a first batch of network devices and a second batch of network devices have one or more common network devices; and execute a filtering operation to evaluate, for the first batch of network devices or the second batch of network devices, an accuracy of the determined geo-position of each network device in the first batch of network devices or the second batch of network devices based on an exclusion of one or more common network devices;

re-determine, iteratively between the first batch of network devices and the second batch of network devices until convergence, the geo-position of each network device in the first batch of network devices and the second batch of network devices based on utilizing the one or more common network devices as one or more anchor network devices in response to the accuracy of the determined geo-position being less than a threshold.

2. The network node of claim 1, wherein each batch of network devices in the plurality of batches of network devices include at least one anchor network device.

3. The network node of claim 2, wherein a number of GNSS pseudorange measurements associated with the at least one anchor network device is greater than a threshold.

4. The network node of claim 2, wherein a number of inter-network device ranging measurements associated with the at least one anchor network device is greater than a threshold.

5. The network node of claim 1, wherein each batch of network devices in the plurality of batches of network devices include at most a predetermined number of network devices.

6. The network node of claim 5, wherein to identify the plurality of batches of network devices, the localization logic is further configured to maximize a number of network devices associated with at least one GNSS pseudorange measurement in each of one or more batches of network devices.

7. The network node of claim 1, wherein the identifying of the plurality of batches of network devices and the determining of the geo-position are performed independently of each other.

8. The network node of claim 1, wherein the identifying of the plurality of batches of network devices and the determining of the geo-position are performed in a combined fashion.

9. The network node of claim 8, wherein the localization logic is further configured to evaluate, for each batch of network devices, an accuracy of the determined geo-position of each network device in the batch of network devices.

10. The network node of claim 9, wherein the localization logic is further configured to:

add an anchor network device to at least one batch of network devices in response to the accuracy of the determined geo-position associated with the at least one batch of network devices is less than a threshold; and re-determine, for the at least one batch of network devices, the geo-position of each network device in the at least one batch of network devices based at least in part on the added anchor network device.

11. The network node of claim 1, wherein the plurality of batches of network devices is identified based on neighbor knowledge associated with the plurality of network devices.

12. The network node of claim 11, wherein the localization logic is further configured to obtain the neighbor knowledge associated with the plurality of network devices based on one or more of a plurality of air pressure readings, a plurality of neighbor discovery protocol (NDP) packets, or a plurality of received signal strength indicator (RSSI) measurements.

13. The network node of claim 1, wherein at least one batch of network devices in the plurality of batches of network devices are located on a same floor.

14. The network node of claim 1, wherein at least one batch of network devices in the plurality of batches of network devices are located on one than one floors.

15. The network node of claim 1, wherein the plurality of batches of network devices is identified based on at least some inter-network device ranging measurements in the one or more inter-network device ranging measurements.

16. The network node of claim 1, wherein one or more network devices in the plurality of network devices each correspond to an access point (AP).

17. A network device, comprising:

a processor;

at least one network interface controller configured to provide access to a network; and a memory communicatively coupled to the processor, wherein the memory comprises a geolocation logic that is configured to:

obtain one or more pseudorange measurements via a global navigation satellite system (GNSS) receiver;

obtain one or more inter-network device ranging measurements to one or more other network devices;

transmit an indication of the one or more pseudorange measurements and an indication of the one or more inter-network device ranging measurements to a network node;

receive an indication of a geo-position of the network device from the network node;

partition the plurality of network devices into groups to compute;

identify a first batch of network devices and a second batch of network devices in the plurality of batches of network devices, the first batch of network devices and the second batch of network devices having one or more common network devices; and evaluate, for the first batch of network devices or the second batch of network devices, an accuracy of the determined geo-position of each network device in the first batch of network devices or the second batch of network devices based on an exclusion of one or more common network devices.

18. A method for geolocating a plurality of network devices, comprising:

receiving a plurality of global navigation satellite system (GNSS) pseudorange measurements associated with a first subset of network devices in the plurality of network devices and one or more inter-network device ranging measurements associated with a second subset of network devices in the plurality of network devices;

partitioning the plurality of network devices into groups to compute, batch-by-batch, for each batch of network devices, a geo-position of each network device in the batch of network devices based on a subset of the plurality of GNSS pseudorange measurements associated with the batch of network devices or a subset of the one or more inter-network device ranging measurements associated with the batch of network devices;

identifying a first batch of network devices and a second batch of network devices in the plurality of batches of network devices, the first batch of network devices and the second batch of network devices having one or more common network devices; and evaluating, for the first batch of network devices or the second batch of network devices, an accuracy of the determined geo-position of each network device in the first batch of network devices or the second batch of network devices based on an exclusion of one or more common network devices.

* * * * *